United States Patent Office 3,846,095
Patented Nov. 5, 1974

3,846,095
REDUCING GAS GENERATION
William B. Crouch, Whittier, Calif., assignor to
Texaco Inc., New York, N.Y.
No Drawing. Filed Apr. 30, 1973, Ser. No. 355,993
Int. Cl. C10j 1/00
U.S. Cl. 48—196 R
16 Claims

ABSTRACT OF THE DISCLOSURE

Gaseous mixtures comprising principally $H_2$ and CO are made by the noncatalytic partial oxidation of a hydrocarbonaceous fuel in the reaction zone of a gas generator in the absence of supplemental $H_2O$ other than any which may be produced by the process. Supplemental $NH_3$ is introduced into the reaction zone as a temperature moderator. Reducing gas may be produced thereby at a lower temperature and with an improved quality. Thus, the effluent gas stream from the reaction zone may have a reducing rio, e.g. mole ratio $(H_2+CO)/(H_2O+CO_2)$ of at least about 10, and usually in the range of about 15 to 100.

BACKGROUND OF THE INVENTION

Field of the invention

This invention relates to the production of reducing gas. More particularly it relates to improvements in the partial oxidation process for producing high quality reducing gas comprising principally $H_2$ and CO.

Description of the prior art

Gaseous mixtures containing $H_2$ and CO may be made by the partial oxidation of petroleum feedstocks in a synthesis gas generator. Reference is made to coassigned U.S. 2,809,104 D. M. Strasser et al. for a description of this process. Ordinarily, oxygen and steam are mixed with an atomized spray of liquid fuel to form a mixture which is reacted in the reaction zone of a gas generator at an autogenous temperature in the range of about 1800 to 3500° F.

The partial oxidation reaction is highly exothermic and steam is most commonly used to moderate the temperature in the reaction zone. $CO_2$ and mixtures of $H_2O$ and $CO_2$ have also been used as temperature moderators. In such case, the effluent gas from the gas generator comprises principally $H_2$, CO, $H_2O$, $CO_2$ and up to 20 wt. percent carbon soot (basis weight of carbon in feed to generator). Other gaseous impurities may include $CH_4$, A, $N_2$, $H_2S$, and COS. The gas produced may be used as synthesis gas, fuel gas, or processed further to produce substantially pure hydrogen.

The quality of a gas to effect the reduction of metal ores to metals may be measured by its reducing ratio, i.e., the mole ratio $(H_2+CO)/(H_2O+CO_2)$. When $H_2O$, $CO_2$ and mixtures thereof are used as temperature moderators in the gas generator, the product gas has a reducing ratio in the range of about 1 to 8. By means of the subject improvement, reducing gas may be produced having a substantially higher reducing ratio.

SUMMARY

This invention pertains to a continuous process for the production of gaseous mixtures principally comprising $H_2$ and CO. The product gas is especially suitable for use as a reducing gas for example to reduce metal ores to metals. Its reducing ratio i.e. mole ratio $(H_2+CO)/(H_2O+CO_2)$ is at least about 10, and usually in the range of about 15 to 100. The product gas may also be used as synthesis gas, fuel gas, and as a source for hydrogen. The gas is produced by the partial oxidation of a hydrocarbonaceous fuel with a free-oxygen containing gas in the presence of $NH_3$ as a temperature moderator at an autogenous temperature in the range of about 1500 to 3500° F. and a pressure in the range of about 1 to 350 atmospheres. No supplemental $H_2O$ is introduced into the reaction zone, except that which may be initially present in the reactants as an impurity, or that which may be produced in the reaction zone.

DESCRIPTION OF THE INVENTION

The present invention pertains to an improved continuous process for the production of reducing gas principally comprising hydrogen and carbon monoxide and having a minimum reducing ratio, i.e. mole ratio $(H_2+CO)/(H_2O+CO_2)$, of about 10, and usually in the range of about 15 to 100.

In the subject process, a continuous stream of reducing gas is produced in the refractory lined reaction zone of a free-flow unpacked noncatalytic gas generator by the partial oxidation of a hydrocarbonaceous feed with a free-oxygen containing gas in the presence of ammonia as a temperature moderator and in the absence of additions of supplemental $H_2O$, $CO_2$, or both. The gas generator is preferably a vertical steel pressure vessel such as described in coassigned U.S. Pat. 2,992,906 issued to F. E. Guptill, Jr. The feedstreams are introduced into the reaction zone of the gas generator by means of a fuel burner. Suitably, a single annulus-type burner, such as described in coassigned U.S. Pat. No. 2,928,460 issued to du Bois Eastman et al., or a double annulus burner, as shown in coassigned U.S. Pat. 3,705,108 issued to C. P. Marion et al., may be employed.

The feedstreams are reacted without a catalyst at an autogenous temperature in the range of about 1500 to 3500° F. and at a pressure in the range of about 1 to 350 atmospheres. The reaction time in the gas generator is about 1 to .5 seconds. The admixture of effluent gas leaving the gas generator may have the following composition in mole percent: $H_2$, 15–60; CO, 15–80; $Co_2$, 0–8; $H_2O$, 0–8; $CH_4$, O–2; $N_2$, .5–75; $H_2S$, 0–5; COS, 0 to 1, and A, 0–1. Unreacted particulate carbon (on the basis of carbon in the feed by weight) is about 0.2 to 20 weight percent from liquid feeds but is usually negligible from gaseous hydrocarbon feeds.

A wide range of combustible carbon containing organic materials may be reacted in the gas generator to produce the reducing gas. The term hydrocarbonaceous, as used herein to describe various suitable feedstocks, is intended to include gaseous, liquid, and solid hydrocarbons, carbonaceous materials, and mixtures thereof. In fact, substantially any combustible carbon containing organic material, or slurries thereof, may be included within the definition of the term "hydrocarbonaceous." For example, there are (1) pumpable slurries of solid carbonaceous fuels, such as coal particulate carbon, petroleum coke, concentrated sewar sludge; and mixtures thereof; (2) gas-solid suspensions, such as finely ground solid carbonaceous fuels dispersed in either a temperature-moderating gas or in a gaseous hydrocarbon; and (3) gas-liquid-solid dispersions, such as atomized liquid hydrocarbon fuel and particulate carbon dispersed in a temperature-moderating gas.

The term liquid hydrocarbon, as used herein to describe suitable liquid feedstocks, is intended to include various materials, such as liquefied petroleum gas, petroleum distillates and residues, gasoline, naphtha, kerosene, crude petroleum, asphalt, gas oil, residual oil, tar-sand and shale oil, coal oil aromatic hydrocarbon (such as benzene, toluene, xylene fractions) coal tar, cycle gas oil from fluid-catalytic-cracking operation; furfural extract of coker gas oil; and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously and may include paraffinic, olefinic, naphthenic and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature or it may be preheated to a temperature up to as high as about 600° F. to 1200° F., but preferably below its cracking temperature. The hydrocarbonaceous feed may be introduced into the burner in liquid or vapor phase or in a vaporized mixture with the temperature moderator.

The addition of supplemental $H_2O$ to the reaction zone has a detrimental effect on the quality of the product gas. In this context, the quality of the reducing gas relates to its reducing ratio. As previously mentioned, by definition the reducing ratio of the reducing gas is the mole ratio $(H_2+CO)/(H_2O+CO_2)$. By substantially eliminating the introduction of supplemental $H_2O$, $CO_2$, or mixtures of both into the reaction zone by means of the subject invention, the quality of the reducing gas may be increased.

By means of the subject invention, the temperature in the reaction zone of the gas generator may be moderated with ammonia in accordance with the following endothermic reactions. In addition, less fuel preheat will be required.

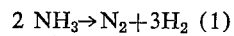
$2\ NH_3 \rightarrow N_2 + 3H_2$ (1)
$H_2$ from formula (1) is substituted in formula (2)
$H_2 + CO_2 \rightarrow CO + H_2O$ (2)
$NH_3$ (feed conditions) $\rightarrow NH_3$ (combustion conditions)

From about 0.01 to 1.5 and preferably in the range of about 0.1 to 0.5 lbs. of $NH_3$ per lb. of hydrocarbonaceous feedstock may be introduced into the reaction zone as the temperature moderator. Liquid or vaporous anhydrous ammonia may be introduced into the reaction zone of the gas generator by any suitable manner: for example as a separate stream, or in admixture with the hydrocarbonaceous fuel or by various combinations of the aforesaid. Suitably, the anhydrous ammonia is introduced into the reaction zone of the gas generator in admixture with the hydrocarbonaceous feed at a temperature in the range of ambient to 900° F.

The term free-oxygen containing gas, as used herein is intended to include air, oxygen-enriched air, i.e. greater than 21 mole percent oxygen, and substantially pure oxygen, i.e. greater than 95 mole percent oxygen (the remainder comprising $N_2$ and rare gases). Free-oxygen containing gas may be introduced into the burner at a temperature in the range of about ambient to 1200° F. The ratio of free-oxygen in the oxidant to carbon in the feedstock (O/C atom/atom) is in the range of about 0.8 to 1.2, and preferably about 0.95 to 1.15. Substantially pure oxygen is preferred to reduce the amount of nitrogen and other gaseous impurities that may otherwise be introduced into the product gas.

The effluent gas from the gas generator may be introduced directly into an ore reduction zone to effect reduction of metal ore to the base metal. Alternatively, the effluent gas from the gas generator may be partially cooled, cleaned, and purified prior to introduction into an ore reduction zone, or into a catalytic reactor for chemical synthesis.

For example, effluent gas leaving the gas generator at a temperature greater than about 2300° F. may be cooled and cleaned prior to introduction into a blast-furnace. By this means a large portion of the metallurgical coke normally used for reducing iron ore to molten iron may be replaced by reducing gas. Thus, the effluent gas stream from the gas generator may be passed through an inline waste heat boiler in noncontact heat exchange with water. The stream of effluent gas is thereby cooled to a temperature below 2300° F. and preferably in the range of about 1800 to 2300° F. for introduction into the blast furnace. In other applications, the temperature of the effluent gas from the gas generator may be cooled to a proper temperature, for example 400 to 900° F. By-product saturated steam may be produced thereby at a pressure normally in the range of about 25 to 1500 p.s.i. above the pressure of the effluent gas stream, for use elsewhere in the process.

Optionally, the partially cooled stream of effluent gas leaving the waste heat boiler may be passed into a gas cleaning and purification zone where entrained solids and particulate carbon, as well as gaseous impurities may be separated and removed. Slurries of particulate carbon in a liquid hydrocarbon may be produced in the gas cleaning section. It is economically desirable for such slurries to be recycled to the gas generator as at least a portion of the feedstock. Any conventional procedure suitable for removing suspended solids from a gas stream may be used. In one embodiment of the invention the effluent gas stream from the generator is cooled in a waste heat boiler and then introduced into a gas-liquid scrubbing zone where it is scrubbed with a scrubbing fluid, such as liquid hydrocarbon. A typical liquid-gas tray-type contacting column may be used such as that described in Perry's Chemical Engineers' Handbook, Fourth Edition, McGraw Hill 1963, pages 18-3 to 5.

By passing the stream of gas up a scrubbing column in direct contact and counter flow with a hydrocarbon scrubbing fluid or with dilute mixtures of particulate carbon and scrubbing fluid flowing down the column, the particulate carbon may be removed from the synthesis gas. A slurry of particulate carbon and scrubbing fluid is removed from the bottom of the column and sent to a carbon separation or concentration zone. Carbon concentration may be effected by any suitable conventional means, e.g. filtration, centrifuge, gravity settling, or by liquid hydrocarbon extraction. Clean scrubbing fluid or dilute mixtures of scrubbing fluid and particulate carbon may be recycled to the top of the column for scrubbing more reducing gas, as shown in coassigned U.S. 3,709,669, Marion et al. Other suitable conventional gas cooling and cleaning procedures may be used in combination with or in place of the aforesaid scrubbing column. For example, the stream of effluent gas may be introduced below the surface of a pool of quenching and scrubbing fluid by means of a dip-tube unit. Or the stream of effluent gas may be passed through a plurality of scrubbing steps including an orifice-type scrubber or venturi or nozzle scrubber, such as shown in Perry's Chemical Engineers' Handbook Fourth Edition McGraw-Hill 1963, pages 18-54 to 56 and coassigned U.S. 3,639,261 issued to W. Slater.

Included in the gas purification zone preferably after the gas scrubbing section are means for removing as desired any or all of the following gaseous impurities when present in the effluent gas stream: $H_2O$, $CO_2$, $N_2$, $H_2S$, COS, $CH_4$, A, and $NH_3$. Any suitable conventional process or combination of processes may be used for purifying the effluent gas stream. Typical gas purification processes may involve refrigeration and physical or chemical absorption with a solvent, such as methanol, n-methyl-pyrrolidone, triethanolamine, propylene carbonate, or alternately with hot potassium carbonate.

DESCRIPTION OF THE PREFERRED EMBODIMENTS

The following examples are offered as a better understanding of the present invention, but the invention is not to be construed as limited thereto.

A petroleum feedstock comprising heavy fuel oil at a temperature of 400° F. is introduced by means of an annulus type burner into a 14.85 ft. free-flow noncatalytic refractory lined synthesis gas generator of the type previously described at a pressure of 30 p.s.i.g. Simultaneously a stream of anhydrous ammonia and a separate stream of substantially pure oxygen, each at a temperature of about 400° F., are introduced into the reaction zone of the gas generator by way of said annulus burner of the type shown in coassigned U.S. 3,705,108. Suitably, the oxygen stream is passed through the central conduit and the stream of anhydrous ammonia is passed through the outer annulus. The substantially pure oxygen comprises in mole percent $O_2$ 99.7 and A 0.3. The process fuel has a gravity of 15.0° API and the following ultimate analysis in weight percent: C, 85.99; $H_2$, 11.28; $O_2$, 0.13; $N_2$, 0.88; 1.69; and ash 0.03.

Two levels of anhydrous ammonia vapor are selected as the temperature moderator i.e., 0.125 lb. $NH_3$/lb. oil and 0.250 lb. $NH_3$/lb. oil. For comparison purposes, a run is made with steam as the temperature moderator, i.e., 0.250 lb. steam/lb. oil.

By partial oxidation of the fuel oil feed in the reaction zone of the gas generator at an autogenous temperature, a product gas principally comprising about 24,000 standard cubic feet per hour (s.c.f./hr.) of $H_2+CO$ is produced.

A summary of the feed to the gas generator, temperature, and analyses of the product gas and its reducing quality are shown in Table I. An atomic ratio (O/C) of 1.00 and 1.04 and a soot level of 5 and 2 wt. percent (basis weight of carbon in fuel oil feed) are also selected.

From Table I, it may be shown that replacing steam with ammonia as a temperature moderator will substantially reduce the temperature in the reaction zone of the gas generator (about 195° F., reduction) and increase the reducing ratio (about 500 to 900% increase). For example, runs 1 and 5 have about the same O/C ratio, and particulate carbon (soot) level. In Run 1 the temperature moderator is ammonia. In Run 5 the temperature moderator is steam. Further, twice as much steam is employed than ammonia. Yet with ammonia as the temperature moderator in Run 1 the reducing gas is produced at a generator temperature of 2562° F. and with a reducing ratio of 36.5. In comparison with steam as the temperature moderator in Run 5 the generator temperature is 2757° F. and the reducing ratio is 6.86. A similar comparison may be made at a lower level of soot made by comparing Runs 2 and 6.

A comparison between Runs 3 and 4 shows that by doubling the amount of ammonia addition while keeping the other parameters substantially the same, the generator temperature may be dropped about 737° F. to a temperature of 1959° F.

TABLE I

| | Run number | | | | | |
|---|---|---|---|---|---|---|
| | 1 | 2 | 3 | 4 | 5 | 6 |
| Oil rate (lbs./hr.) | 475.8 | 460.8 | 470.6 | 411.2 | 527.7 | 509.5 |
| Oxygen rate (lbs./hr.) | 554.7 | 537.2 | 570.7 | 545.7 | 605.7 | 584.8 |
| O/C ratio (atomic ratio) | 1.0 | 1.0 | 1.04 | 1.04 | 1.0 | 1.0 |
| Ammonia rate (lbs./hr.) | 67.97 | 65.82 | 67.23 | 137.1 | | |
| $NH_3$/oil (lb./lb.) | 0.125 | 0.125 | 0.125 | 0.250 | | |
| Steam rate (lbs./hr.) | | | | | 131.9 | 127.4 |
| Steam/oil ratio (lb./lb.) | | | | | 0.25 | 0.25 |
| Product gas, wet (lb., moles/hr.) | 67.21 | 66.09 | 67.51 | 68.43 | 72.96 | 71.53 |
| Gas analysis, mole percent: | | | | | | |
| CO | 48.27 | 49.41 | 48.97 | 45.81 | 46.29 | 47.34 |
| $H_2$ | 45.81 | 46.29 | 44.70 | 46.62 | 40.38 | 41.07 |
| $CO_2$ | .61 | .26 | .69 | .97 | 2.88 | 2.61 |
| $H_2O$ | 1.97 | .76 | 2.36 | 1.98 | 9.75 | 8.30 |
| $CH_4$ | .01 | .01 | .01 | .08 | .01 | .01 |
| A | .08 | .08 | .08 | .07 | .08 | .08 |
| $N_2$ | 2.87 | 2.82 | 2.82 | 4.12 | .23 | .22 |
| $H_2S$ | .36 | .35 | .35 | .33 | .36 | .35 |
| COS | .02 | .02 | .02 | .02 | .02 | .02 |
| Carbon make (lbs/hr.) | 20.89 | 8.15 | 8.33 | 8.03 | 22.85 | 8.91 |
| Particulate carbon (wt., percent basis C in oil) | 5.0 | 2.0 | 2.0 | 2.0 | 5.0 | 2.0 |
| Reducing ratio ($H_2+CO/H_2O+CO_2$) | 36.5 | 93.4 | 30.7 | 31.3 | 6.86 | 8.11 |
| Generator temp., °F | 2,562 | 2,452 | 2,696 | 1,959 | 2,757 | 2,654 |
| SOC number, SCF $O_2$/MSCF ($H_2+CO$) | 273 | 265 | 281 | 269 | 298 | 288 |

At this temperature the reducing gas may be introduced directly into an ore reduction zone. For example, the reducing gas may be introduced into an iron ore blast furnace by means of injector conduits that pass through the wall of the blast furnace at a portion above the mantle where the temperature on the inside of the blast furnace is about the same as the temperature of the entering reducing gas, i.e. about 1800 to 2300° F. Thus, an economic advantage is achieved by keeping the effluent gas stream from the gas generator in this temperature range or slightly above to allow for heat loss in the lines. In this manner a gas cooler, waste heat trimming boiler, and recycle gas compressor may be eliminated from the system.

Another advantage of the subject process as shown in Table I is that when ammonia replaces steam as the temperature moderator, the specific oxygen consumption (SOC Number) is reduced. The SOC number is the ratio of the standard cubic feet of oxygen consumed to produce 1000 standard cubic feet of hydrogen plus carbon monoxide product.

The process of the invention has been described generally and by example with reference to liquid hydrocarbon feedstocks, effluent gas streams and various other materials of particular compositions for purposes of clarity and illustration only. From the foregoing it will be apparent to those skilled in the art that the various modifications of the process and the materials disclosed herein can be made without departure from the spirit of the invention.

I claim:

1. In a process for producing gaseous mixtures comprising principally hydrogen and carbon monoxide and containing a small amount of impurities selected from the group consisting of $H_2O$, $CO_2$, $CH_4$, A, $N_2$, $H_2S$, COS, particulate carbon, and mixtures thereof, by the partial oxidation of a hydrocarbonaceous fuel with a free-oxygen containing gas in the reaction zone of a free-flow gas generator at a temperature in the range of about 1500 to 3500° F. and a pressure in the range of about 1–350 atmospheres in the presence of a temperature moderator, the improvement comprising introducing into said reaction zone along with said reactants supplemental $NH_3$ as said temperature moderator in an amount in the range of about 0.01 to 1.5 lbs. of $NH_3$ per lb. of hydrocarbonaceous fuel, and wherein substantially no supplemental $H_2O$ is introduced into said reaction zone other than that produced therein and that which may be initially present in the reactants as an impurity; wherein the gas stream leaving said reaction zone has a reducing ratio, i.e. mole ratio $(H_2+CO)/(H_2O+CO_2)$ of at least 10.0.

2. The process of claim 1 wherein said $NH_3$ is anhydrous and is introduced in liquid or vapor form.

3. The process of claim 2 wherein said anhydrous $NH_3$ is introduced into said reaction zone as a separate stream or in admixture with said hydrocarbonaceous fuel, or both.

4. The process of claim 1 wherein the free-oxygen containing gas is selected from the group consisting of air, oxygen-enriched air containing at least 21 mole percent $O_2$, and substantially pure oxygen containing at least 95 mole percent $O_2$.

5. The process of claim 1 wherein said hydrocarbonaceous fuel is a liquid hydrocarbon selected from the group consisting of liquefied petroleum gas; crude petroleum; petroleum distillates and residues such as gasoline, naphtha, kerosene, asphalt, gas oil and residual oil; tar-sand oil; shale oil; coal oil; aromatic hydrocarbons such as benzene, toluene and xylene fractions; coal tar; cycle gas oil from fluid-catalytic-cracking operation; furfural extract of coker gas oil; and mixtures thereof.

6. The process of claim 1 wherein said hydrocarbonaceous fuel is a gaseous hydrocarbon selected from the group consisting of methane, ethane, propane, butane, pentane, natural gas, water gas, coke-oven gas, refinery gas, acetylene tail gas, ethylene off-gas, and mixtures thereof.

7. The process of claim 1 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

8. The process of claim 1 wherein said hydrocarbonaceous fuel is a pumpable slurry of solid carbonaceous fuels selected from the group consisting of coal, particulate carbon, petroleum coke, and concentrated sewage sludge.

9. The process of claim 1 further provided with the step of preheating the hydrocarbonaceous fuel to a temperature up to 1200° F. but below its cracking temperature prior to introducing said fuel into the gas generator in step (1).

10. The process of claim 1 provided with the additional steps of cooling the gas stream from the reaction zone to a temperature in the range of about 400 to 2300° F. by indirect heat exchange with water thereby producing steam.

11. A process for producing reducing gas comprising,
(1) introducing into the reaction zone of a free-flow non-catalytic gas generator a hydrocarbonaceous fuel, a free-oxygen containing gas in an amount to provide an atomic ratio of oxygen to carbon in the fuel of about 0.95 to 1.15, and about 0.01 to 1.50 lbs. of anhydrous $NH_3$ per lb. of hydrocarbonaceous fuel and wherein substantially no supplemental $H_2O$ is introduced into said reaction zone other than that produced therein and that which may be initially present in the reactants as an impurity, and
(2) reacting said hydrocarbonaceous fuel in said gas generator by partial oxidation at an autogenous temperature in the range of about 1500 to 3500° F. and at a pressure in the range of about 1 to 350 atmospheres to produce an effluent gas stream comprising principally $H_2$ and CO, and containing a small amount of impurities selected from the group consisting of $H_2O$, $CO_2$, $CH_4$, A, $N_2$, $H_2S$, COS, particulate carbon, and mixtures thereof; and
(3) cooling the effluent gas stream from (2) to a temperature in the range of about 400 to 2300° F. by indirect heat exchange wherein the mole ratio $(H_2+CO)/(H_2O+CO_2)$ is at least 10 in said effluent gas stream.

12. The process of claim 11 wherein said cooling is effected by indirect heat exchange with water so as to produce steam.

13. The process of claim 11 provided with the additional steps of cleaning with a liquid hydrocarbon, and purifying said effluent gas stream from step (3).

14. The process of claim 11 provided with the additional step of introducing said reducing gas at substantially the same temperature as produced in step (3) into an ore reduction zone to reduce metal ores to metal.

15. The process of claim 14 wherein said ore reduction zone is an iron ore blast furnace and the temperature of said reducing gas is in the range of about 1800 to 2300° F.

16. The process of claim 11 wherein said free-oxygen containing gas is substantially pure oxygen.

References Cited

UNITED STATES PATENTS

| | | | |
|---|---|---|---|
| 3,759,837 | 9/1973 | Dille et al. | 252—373 |
| 3,620,699 | 11/1971 | Reynolds et al. | 48—212 |
| 3,639,261 | 2/1972 | Slater | 252—373 |
| 3,694,373 | 9/1972 | Slater et al. | 252—373 |

S. LEON BASHORE, Primary Examiner

P. F. KRATZ, Assistant Examiner

U.S. Cl. X.R.

48—197 R, 209, 210, 212; 252—373